US009096704B2

(12) United States Patent
Chang et al.

(10) Patent No.: US 9,096,704 B2
(45) Date of Patent: *Aug. 4, 2015

(54) IMPACT MODIFIER, METHOD FOR PREPARING THE SAME AND SCRATCH RESISTANT METHACRYLATE RESIN COMPOSITION USING THE SAME

(75) Inventors: Ki Bo Chang, Yeosu-si (KR); Doo Han Ha, Yeosu-si (KR); Dong Wook Jung, Yeosu-si (KR); Jae Hun Jung, Yeosu-si (KR)

(73) Assignee: Cheil Industries Inc., Gumi-si (KR)

( * ) Notice: Subject to any disclaimer, the term of this patent is extended or adjusted under 35 U.S.C. 154(b) by 667 days.

This patent is subject to a terminal disclaimer.

(21) Appl. No.: 12/476,396

(22) Filed: Jun. 2, 2009

(65) Prior Publication Data
US 2009/0240002 A1 Sep. 24, 2009

Related U.S. Application Data

(63) Continuation-in-part of application No. PCT/KR2007/006925, filed on Dec. 28, 2007.

(30) Foreign Application Priority Data

Dec. 28, 2006 (KR) .................. 10-2006-0137126

(51) Int. Cl.
*C08L 51/00* (2006.01)
*C08F 279/02* (2006.01)
*C08F 265/04* (2006.01)
*C08F 265/06* (2006.01)
*C08L 33/12* (2006.01)
*C08L 51/04* (2006.01)

(52) U.S. Cl.
CPC ............. *C08F 279/02* (2013.01); *C08F 265/04* (2013.01); *C08F 265/06* (2013.01); *C08L 33/12* (2013.01); *C08L 51/04* (2013.01); *C08L 51/003* (2013.01)

(58) Field of Classification Search
CPC ..... C08L 51/04; C08L 51/003; C08F 279/02; C08F 265/04
USPC ........................ 525/83, 85, 70, 228
See application file for complete search history.

(56) References Cited

U.S. PATENT DOCUMENTS

| 4,173,596 | A | * | 11/1979 | De Witt .................. 428/402 |
| 4,442,262 | A | * | 4/1984 | Yusa et al. ................ 525/69 |
| 4,443,585 | A | | 4/1984 | Goldman |
| 4,801,646 | A | | 1/1989 | Henton |
| 4,908,414 | A | | 3/1990 | Bronstert et al. |
| 5,204,406 | A | * | 4/1993 | Fujii et al. ................ 525/73 |
| 5,242,982 | A | | 9/1993 | Oshima et al. |
| 5,382,625 | A | | 1/1995 | Lindner et al. |
| 5,969,042 | A | | 10/1999 | Tiefensee et al. |
| 6,531,185 | B1 | | 3/2003 | Drujon et al. |
| 6,777,492 | B1 | * | 8/2004 | Nakai et al. ................ 525/80 |
| 6,811,859 | B2 | | 11/2004 | Bonnet et al. |
| 2003/0109638 | A1 | | 6/2003 | Briggs et al. |
| 2006/0147714 | A1 | | 7/2006 | Schultes et al. |
| 2007/0167573 | A1 | | 7/2007 | Stork et al. |
| 2009/0043047 | A1 | * | 2/2009 | Ha et al. .................. 525/77 |

FOREIGN PATENT DOCUMENTS

| CN | 1247201 A | | 3/2000 |
| DE | 19527579 A1 | | 1/1997 |
| DE | 19961894 A1 | | 6/2001 |
| DE | 10260065 A1 | | 7/2004 |
| EP | 0985692 A2 | | 3/2000 |
| EP | 2027207 A1 | | 2/2009 |
| JP | 61-195148 A | | 8/1986 |
| KR | 10-2004-0049066 A | | 6/2004 |
| WO | WO 03040231 | * | 5/2003 |
| WO | 2005/059029 A1 | | 6/2005 |
| WO | 2007129835 A1 | | 11/2007 |
| WO | 2008082173 A1 | | 7/2008 |

OTHER PUBLICATIONS

International Search Report in counterpart International Application No. PCT/KR2007/006925, mailed on Mar. 26, 2008.
Landier, C. et al., Synthesis of Core/Shell Latexes in a Continuous Stirred Tank Reactor, Industrial & Engineering Chemistry Research, Feb. 2004, vol. 43, No. 3, pp. 700-707, ISSN 0888-5885.
Taiwanese Office Action in counterpart Taiwanese Application No. 096115835 mailed Jul. 28, 2011, pp. 1-4.
English translation of Taiwanese Office Action in counterpart Taiwanese Application No. 096115835 mailed Jul. 28, 2011, pp. 1-5.
International Search Report in commonly owned International Application No. PCT/KR2007/002187, mailed on Aug. 8, 2007, pp. 1-2.
International Preliminary Report on Patentability in commonly owned International Application No. PCT/KR2007/002187, issued on Nov. 4, 2008, pp. 1-4.
European Office Action in commonly owned European Application No. EP07746342.0-2109, dated Jun. 18, 2009, pp. 1-2.
European Office Action in commonly owned European Application No. EP07746342.0-2109, dated Feb. 24, 2010, pp. 1-3.
European Search Report in commonly owned European Application No. 07746342, dated Apr. 16, 2009, pp. 1-2.
Office Action in commonly owned U.S. Appl. No. 12/253,463 dated Mar. 17, 2011, pp. 1-9.

* cited by examiner

*Primary Examiner* — Irina Krylova
(74) *Attorney, Agent, or Firm* — Additon, Higgins & Pendleton, P.A.

(57) ABSTRACT

Disclosed herein is an impact modifier formed by graft polymerizing about 45 to about 70% by weight of a rubber polymer with about 30 to about 55% by weight of a methacrylate-based monomer, wherein said rubber polymer is prepared by polymerizing about 0.1 to about 1 part by weight of an antioxidant with about 100 parts by weight of a monomer mixture comprising about 30 to about 45% by weight of a diene-based monomer and about 55 to about 70% by weight of alkyl acrylate. The methacrylate-based resin composition of the present invention using the aforementioned impact modifier may have improved transparency, impact resistance and a good appearance.

13 Claims, No Drawings

IMPACT MODIFIER, METHOD FOR PREPARING THE SAME AND SCRATCH RESISTANT METHACRYLATE RESIN COMPOSITION USING THE SAME

CROSS-REFERENCE TO RELATED APPLICATIONS

This non-provisional application is a continuation-in-part application of PCT Application No. PCT/KR2007/006925, filed Dec. 28, 2007, pending, which designates the U.S. and which is hereby incorporated by reference in its entirety, and claims priority therefrom under 35 USC Section 120. This application also claims priority under 35 USC Section 119 from Korean Patent Application No. 10-2006-0137126, filed Dec. 28, 2006, the entire disclosure of which is also hereby incorporated by reference.

FIELD OF THE INVENTION

The present invention relates to an impact modifier capable of improving impact resistance while maintaining transparency and scratch resistance, a method for preparing the same, and a scratch resistant methacrylate-based resin composition using the same.

BACKGROUND OF THE INVENTION

In general, methacrylate-based resins have sufficient stiffness, high transmittance (transparency) and excellent scratch resistance resulting from superior stiffness. Due to such characteristics, methacrylate-based resins are used in various fields. For example, injection molded articles formed of methacrylate-based resins are used as rear lamp assemblies for automobiles, instrument panel covers for automobiles, eyeglass lenses, and the like, and extruded articles formed of methacrylate-based resins are used as signboards and various sheet products.

However, mechanical properties of methacrylate-based resins, such as impact resistance, can be deteriorated. Thus, it can be difficult to use methacrylate-based resins for housings requiring impact resistance due to the deterioration of mechanical properties, and in particular impact resistance.

Furthermore, although methacrylate-based resins have excellent surface scratch resistance resulting from superior stiffness, rubbing resistance of methacrylate-based resins can deteriorate as fine scratches are generated on a surface of a product formed of a methacrylate-based resin by repeated rubbing with soft cotton or other towels due to the superior stiffness of the methacrylate-based resins.

Surface characteristics such as rubbing resistance and impact resistance of methacrylate-based resins can be improved by introducing a soft impact modifier. This can, however, reduce the transparency of the methacrylate-based resin.

Some impact modifiers can improve impact resistance while only partially reducing transparency. Such impact modifiers, however, only moderately improve impact resistance.

SUMMARY OF THE INVENTION

The present inventors have developed an impact modifier capable of improving impact strength, rubbing resistance and scratch resistance of methacrylate-based resins. In contrast to prior impact modifiers, the impact modifier of the present invention can improve impact strength without deteriorating transparency. The impact modifier can also improve the balance of physical properties such as flowability, yellow index, impact strength, scratch resistance and the like.

One aspect of the invention provides an impact modifier formed by graft polymerizing about 45 to about 70% by weight of a rubber polymer with about 30 to about 55% by weight of a methacrylate-based monomer, wherein the rubber polymer is prepared by polymerizing about 0.1 to about 1 part by weight of an antioxidant with about 100 parts by weight of a monomer mixture comprising about 30 to about 45% by weight of a diene-based monomer and about 55 to about 70% by weight of alkyl acrylate.

In exemplary embodiments of the invention, the methacrylate-based monomer is an alkyl methacrylate having 1 to 10 carbon atoms.

In exemplary embodiments, the alkyl acrylate is an alkyl acrylate having 1 to 10 carbon atoms.

The antioxidant may be octadecyl 3-(3,5-di-tert-butyl-4-hydroxyphenyl)propionate, triethylene glycol-bis-3(3-tert-butyl-4-hydroxy-5-methylphenyl)propionate, 2,6-di-tert-butyl-4-methylphenol, 2,2'-methylene-bis-(4-methyl-6-tert-butylphenol), tri(2,4-di-tert-butylphenyl)phosphate, n-octadecyl-3(3,5-di-tert-butyl-4-hydroxyphenyl)propionate, 1,3,5-tri(3,5-di-tert-butyl-4-hydroxyphenyl)isocyanate, 3-(3,5-di-tert-butyl-4-hydroxyphenyl), distearyl-thiodipropionate, laurylthio propionate methane, di-phenyl-isooctyl phosphite, or a combination thereof.

Another aspect of the invention provides a method for preparing the foregoing impact modifier. The method comprises the steps of: polymerizing a monomer mixture comprising a diene-based monomer and alkyl acrylate in the presence of an antioxidant to prepare a rubber polymer with a particle diameter of about 150 to about 250 nm; and adding a methacrylate-based monomer into the rubber polymer to graft polymerize the methacrylate-based monomer with the rubber polymer.

In exemplary embodiments of the invention, the monomer mixture comprises about 30 to about 45% by weight of the diene-based monomer and about 55 to about 70% by weight of the alkyl acrylate.

In one embodiment, the alkyl acrylate is an alkyl acrylate having 1 to 10 carbon atoms.

In one embodiment, the methacrylate-based monomer is an alkyl methacrylate having 1 to 10 carbon atoms.

In exemplary embodiments of the invention, the monomer mixture may be polymerized using a cross-linking agent and a molecular weight controlling agent.

The cross-linking agent may be triallyl isocyanurate, allyl methacrylate, or a combination thereof. The cross-linking agent may be used in an amount of about 0.5 to about 1 part by weight, per about 100 parts by weight of the monomer mixture.

The antioxidant may be octadecyl 3-(3,5-di-tert-butyl-4-hydroxyphenyl)propionate or triethylene glycol-bis-3(3-tert-butyl-4-hydroxy-5-methylphenyl)propionate, 2,6-di-tert-butyl-4-methylphenol, 2,2'-methylene-bis-(4-methyl-6-tert-butylphenol), tri(2,4-di-tert-butylphenyl)phosphate, n-octadecyl-3(3,5-di-tert-butyl-4-hydroxyphenyl)propionate, 1,3,5-tri(3,5-di-tert-butyl-4-hydroxyphenyl)isocyanate, 3-(3,5-di-tert-butyl-4-hydroxyphenyl), distearyl-thiodipropionate, laurylthio propionate methane, di-phenyl-isooctyl phosphite, or a combination thereof. The antioxidant may be used in an amount of about 0.1 to about 1 part by weight of the antioxidant, per about 100 parts by weight of the monomer mixture.

In exemplary embodiments, the methacrylate-based monomer may be introduced when a conversion ratio of the rubber polymer is about 70 to about 98%.

Another aspect of the invention provides a methacrylate-based resin composition comprising the foregoing impact modifier. The methacrylate-based resin composition comprises about 55 to about 95% by weight of a methacrylate-based resin and about 5 to about 45% by weight of an impact modifier. The methacrylate-based resin composition may have excellent impact resistance, scratch resistance, transparency and appearance by employing the aforementioned impact modifier.

Another aspect of the invention provides a molded article using the resin composition.

The molded article may be prepared by molding the methacrylate-based resin composition of the present invention, wherein the molded article can have an Izod notched impact strength of about 4.5 kgf·cm/cm or more at a thickness of ¼" according to ASTM D256, a yellow index of about 1.7 or less according to ASTM D1925, a pencil hardness of 1H or more at a load of 500 g and a temperature of 23° C. according to JIS K5401, a total light transmittance of about 92% or more and a haze of about 0.9% or less respectively measured by a color computer manufactured by Suga Instrument Corporation.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

An impact modifier of the present invention is formed by graft polymerizing about 45 to about 70% by weight of a rubber polymer with about 30 to about 55% by weight of a methacrylate-based monomer, wherein the rubber polymer is prepared by polymerizing about 0.1 to about 1 part by weight of an antioxidant with about 100 parts by weight of a monomer mixture comprising about 30 to about 45% by weight of a diene-based monomer and about 55 to about 70% by weight of alkyl acrylate.

The monomer(s) used in the preparation of the rubber polymer may have a low glass transition temperature such that the monomer can exhibit rubber characteristics, and the composition of the monomer mixture used to prepare the rubber polymer may be controlled to maintain the same refractive index as that of a methacrylate-based resin. For instance, the refractive index of the monomer mixture can be controlled to be within a range of a refractive index of a poly(methyl methacrylate) resin of about 1.49±about 0.005.

For example, the diene-based monomer can have a low glass transition temperature of about 70° C. or less. Exemplary diene-based monomers may include without limitation 1,3-butadiene, 2-methyl-1,3-butadiene, 2,3-methyl-1,3-butadiene, 1,3-pentadiene, 1,3-hexadiene and the like and combinations thereof.

The alkyl acrylate may be an alkyl acrylate having 1 to 10 carbon atoms. Exemplary alkyl acrylates may include without limitation octyl acrylate, methyl acrylate, ethyl acrylate, butyl acrylate, and the like, and combinations thereof.

An alkyl methacrylate having 1 to 10 carbon atoms may be used as the methacrylate-based monomer. Exemplary methacrylate-based monomers may include without limitation methyl methacrylate, ethyl methyl methacrylate, propyl methyl methacrylate, butyl methyl methacrylate, hexyl methyl methacrylate, 2-ethylhexyl methyl methacrylate, octyl methyl methacrylate, and the like, and combinations thereof.

In addition, an antioxidant may be used during the preparation of the rubber polymer in the present invention in order to prevent oxidation of the rubber copolymer and lower the yellow index of the rubber copolymer. Exemplary antioxidants include without limitation secondary antioxidants such as thiol-based antioxidants and phosphorous-based antioxidants. Exemplary antioxidants may include without limitation octadecyl 3-(3,5-di-tert-butyl-4-hydroxyphenyl)propionate, triethylene glycol-bis-3(3-tert-butyl-4-hydroxy-5-methylphenyl)propionate, 2,6-di-tert-butyl-4-methylphenol, 2,2'-methylene-bis-(4-methyl-6-tert-butylphenol), tri(2,4-di-tert-butylphenyl)phosphate, n-octadecyl-3(3,5-di-tert-butyl-4-hydroxyphenyl)propionate, 1,3,5-tri(3,5-di-tert-butyl-4-hydroxyphenyl)isocyanate, 3-(3,5-di-tert-butyl-4-hydroxyphenyl), distearyl-thio-dipropionate, laurylthio propionate methane, di-phenyl-isooctyl phosphite, and the like. These antioxidants can be used alone or in combination with one another.

The antioxidant can be used in an amount of about 0.1 to 1 about part by weight, per about 100 parts by weight of the monomer mixture. Use of the antioxidant in the aforementioned range can provide an anti-oxidation effect on the diene-based rubber, and polymerization can proceed smoothly without deterioration of the diene based rubber during the polymerization reaction.

The rubber polymer may be prepared by polymerizing about 30 to about 45% by weight of a diene-based monomer and about 55 to about 70% by weight of an alkyl acrylate in the presence of an antioxidant. Polymerizing the noted amounts of diene-based monomer and alkyl acrylate can minimize the difference between the refractive index of the rubber polymer and a methacrylate-based resin, so that a final resin composition can maintain superior transparency. The rubber polymer can be prepared, for example, by polymerizing about 35 to about 43% by weight of the diene-based monomer and about 57 to about 65% by weight of the alkyl acrylate in the presence of the antioxidant.

The rubber polymer of the present invention may have an average particle diameter range of about 150 to about 250 nm, for example about 170 to about 230 nm, and as another example about 175 to about 220 nm. The noted average particle diameters can have a desirable impact on the resultant impact resistance and transparency.

An impact modifier of the present invention can be prepared by graft polymerizing a methacrylate-based monomer with the rubber polymer.

About 45 to about 70% by weight, for example about 47 to about 65% by weight, and as another example about 49 to 63% by weight, of the rubber polymer is mixed with about 30 to about 55% by weight, for example about 35 to about 53% by weight, and as another example about 37 to 51% by weight, of the methacrylate-based monomer in the graft polymerization. This mixing ratio can provide an impact modifier with excellent impact resistance and further can provide excellent production efficiency and graft polymerization efficiency. Furthermore, the method allows substantially uniform graft polymerization so that the impact modifier can be uniformly dispersed after performing an extrusion or an injection molding process.

In exemplary embodiments, the resultant graft copolymer can be generally characterized as including the noted components in similar amounts, i.e., the graft copolymer can include: about 45 to about 70% by weight, for example about 47 to about 65% by weight, and as another example about 49 to 63% by weight, of a rubber polymer comprising about 30 to about 45% by weight of a diene-based monomer and about 55 to about 70% by weight of alkyl acrylate; about 30 to about 55% by weight, for example about 35 to about 53% by weight, and as another example about 37 to 51% by weight, of a methacrylate-based polymer graft polymerized onto the rubber polymer; and about 0.1 to about 1 part by weight of an antioxidant, based on about 100 parts by weight of the rubber polymer.

The impact modifier according to the present invention can be prepared by the following method.

First, a rubber polymer for improving impact resistance is prepared, and then an impact modifier can be prepared by performing a graft polymerization using a methacrylate-based monomer (such as methyl methacrylate) to provide compatibility of the rubber polymer with a methacrylate-based resin.

In one embodiment of the present invention, the impact modifier may be prepared by polymerizing a monomer mixture comprising a diene-based monomer and an alkyl acrylate in the presence of an antioxidant to prepare a rubber polymer with a particle diameter of about 150 to about 250 nm, and adding a methacrylate-based monomer into the rubber polymer to graft-polymerize the rubber polymer and the methacrylate-based monomer.

As mentioned above, the diene-based monomer and the alkyl acrylate with low glass transition temperatures are selected such that the diene-based monomer and the alkyl acrylate can exhibit rubber characteristics, and specific examples of the diene-based monomer and the alkyl acrylate are the same as the aforementioned examples.

The monomer mixture comprises about 30 to about 45% by weight of the diene-based monomer and about 55 to about 70% by weight of the alkyl acrylate such that a refractive index is maintained within a range of a refractive index of a poly(methyl methacrylate) resin of about 1.49±about 0.005.

The monomer mixture can be polymerized in the presence of additives such as a cross-linking agent, a molecular weight controlling agent, an emulsifier, an electrolyte, and the like, and combinations thereof.

In exemplary embodiments of the invention, the rubber polymer can be prepared in an emulsion polymerization by adding a cross-linking agent, a molecular weight controlling agent and an emulsifier to a monomer mixture comprising a diene-based monomer and an alkyl acrylate in the presence of an antioxidant.

In another embodiment of the present invention, the rubber polymer can be prepared in an emulsion polymerization by adding a cross-linking agent, a molecular weight controlling agent, an emulsifier and an electrolyte to a monomer mixture comprising a diene-based monomer and an alkyl acrylate in the presence of an antioxidant.

In another embodiment of the present invention, the rubber polymer can be prepared by adding a cross-linking agent, a molecular weight controlling agent, an emulsifier and an electrolyte to a monomer mixture comprising a diene-based monomer and an alkyl acrylate in the presence of an antioxidant, heating the reaction temperature to about 50 to about 80° C., for example about 60 to about 75° C., and introducing an initiator thereinto to initiate an emulsion polymerization.

Triallyl isocyanate (TAIC), allyl methacrylate (AMA) or a combination thereof may be used as the cross-linking agent. The cross-linking agent may be used in an amount of about 0.5 to about 1 part by weight, based on about 100 parts by weight of the monomer mixture. When the cross-linking agent is used within this range, an optimal effect can be obtained with respect to transmittance (transparency) and impact resistance.

The molecular weight controlling agent may include alkyl mercaptanes in the form of $CH_3(CH_2)_nSH$ such as n-butyl mercaptane, n-octyl mercaptane, n-dodectl mercaptane, tertiary dodecyl mercaptane, isopropyl mercaptane and n-amyl mercaptane, aromatic compounds such as alpha methyl styrene dimers and alpha ethyl styrene dimmers, halogen compounds including carbon tetra chloride, and the like, and combinations thereof. The molecular weight controlling agent may be used in an amount of about 0.2 to about 1 part by weight, based on about 100 parts by weight of the monomer mixture. Excellent mechanical properties can be obtained using the molecular weight controlling agent in these amounts.

Fatty acid-based emulsifiers such as derivatives in which lauric acid, stearic acid, oleic acid, and the like are substituted by sodium or potassium can be used as the emulsifier. The emulsifier can be used in an amount of about 1 to about 3 parts by weight, based on about 100 parts by weight of the monomer mixture. When the emulsifier is used in these amounts, emulsion stability can be maintained, which can prevent impact resistance deterioration due to large particle diameters of not less than 250 nm or small particle diameters and further can prevent transparency deterioration due to residual emulsifier.

An electrolyte may be used to improve emulsion stability in the preparation of the rubber polymer. An exemplary non-limiting electrolyte is potassium carbamate. The electrolyte can be use in an amount of about 1 to about 3 parts by weight, based on about 100 parts by weight of the monomer mixture. This amount of electrolyte can stabilize polymerization and can prevent deterioration in emulsion stability caused by macronization of particle diameters and high viscosity of particles.

In exemplary embodiments, the resultant graft copolymer can further be generally characterized as including one or more of the noted components in similar amounts, i.e., the rubber component of the graft copolymer can optionally include the cross-linking agent in an amount of about 0.5 to about 1 part by weight, based on about 100 parts by weight of the rubber polymer; and/or the molecular weight controlling agent in an amount of about 0.2 to about 1 part by weight, based on about 100 parts by weight of the rubber polymer. The rubber polymer of the graft copolymer can also optionally include emulsifier in an amount of about 1 to about 3 parts by weight, based on about 100 parts by weight of the rubber polymer and/or electrolyte in an amount of about 1 to about 3 parts by weight, based on about 100 parts by weight of the rubber polymer.

A water-soluble initiator can be used as the initiator in the preparation of the rubber polymer of the present invention, such as a persulfate-based initiator. Exemplary water-soluble initiators include without limitation sodium persulfate, ammonium persulfate, potassium persulfate, and the like, and combinations thereof. The initiator can be used in an amount of about 0.3 to about 1 part by weight, based on about 100 parts by weight of the monomer mixture. This amount of initiator can provide excellent reactivity and prevent the deterioration of physical properties due to reduction of molecular weight without being affected by a polymerization inhibitor and impurities remaining in the monomer.

In a conventional method for preparing a rubber polymer, a core/shell rubber can be prepared in such a manner that a core is formed using a monomer with a high glass transition temperature, the core is covered with a rubber with a low glass transition temperature, and then a hard core is formed in the rubber. However, a rubber is prepared in the present invention by a polymerization method in which a relatively hard rubber is formed by increasing the degree of cross-linking of a rubber formed in the early reaction stage using a mixture of a cross-linking agent having a relatively fast reactivity and a molecular weight controlling agent and a soft rubber is then formed in the second half of the polymerization process.

The rubber is graft polymerized with a methacrylate-based monomer in order to exhibit compatibility with methacrylate-based resins.

The graft polymerization is performed by adding a methacrylate-based monomer into the rubber at point in time when a predetermined polymerization ratio has passed during the preparation of a rubber polymer.

It is desirable to inject the methacrylate monomer at a graft polymerization point in time at which a copolymer rubber has a conversion rate of about 70% to about 98%, for example about 90% to about 96%. If the methacrylate monomer is introduced at a graft polymerization point in time at which the copolymer rubber has a conversion rate of less than about 70%, impact resistance of a prepared impact modifier can be deteriorated. If the methacrylate monomer is introduced at a graft polymerization point in time at which the copolymer rubber has a conversion rate of greater than about 98%, stability of the impact modifier can be deteriorated because an excessive amount of free methacrylate polymer that is not graft polymerized can form due to deficient graft polymerization sites.

In order to obtain transparency, the methacrylate monomer can be injected when the rubber has an average particle diameter of about 150 to about 250 nm.

In the present invention, the predetermined amount of a molecular weight controlling agent may be used to adjust the molecular weight of a polymer produced during the graft polymerization.

In the present invention, a mixture of the molecular weight controlling agent and the methacrylate monomer can be introduced at a point in time at which the rubber has a conversion ratio of about 70% to about 98%.

The molecular weight controlling agent used during the graft polymerization can include any of the aforementioned molecular weight controlling agents used in the preparation of the rubber. In one embodiment of the present invention, n-octyl mercaptane is used. In the present invention, the molecular weight controlling agent is used in an amount of about 0.2 to about 1 part by weight, based on about 100 parts by weight of a mixture of a rubber polymer and a methacrylate monomer during the graft polymerization. When such a range is used, excellent mechanical properties can be obtained.

The prepared graft polymer can be post-treated in a conventional manner and can be used as an impact modifier. For instance, a final impact modifier can be prepared in the form of powder, particulate, particle, granule, or the like, but the form is not limited thereto.

In one embodiment of the present invention, the prepared graft polymer is formed into a powder impact modifier through a post-treatment process and a dehydrating and drying process using a coagulant.

When an impact modifier according to the present invention is added to resins, it is possible to improve transparency, scratch resistance and surface characteristics as well as impact resistance of the resins.

In particular, when the impact modifier is added to methacrylate-based resins, it is possible to improve transparency and scratch resistance.

The present invention provides a methacrylate-based resin composition to which the impact modifier is added. The methacrylate-based resin composition comprises about 55 to about 95% by weight of a methacrylate-based resin and about 5 to about 45% by weight of an impact modifier. The methacrylate-based resin can be a poly(methyl methacrylate). The methacrylate-based resin composition may be prepared by blending the impact modifier with a methacrylate-based resin.

The present invention also provides a molded article using the resin composition.

The molded article can be manufactured by molding a methacrylate-based resin composition of the present invention, wherein the molded article has an Izod notched impact strength of about 4.5 kgf·cm/cm or more at a thickness of ¼" according to ASTM D256, a yellow index of about 1.7 or less according to ASTM D1925, a pencil hardness of 1 H or more at a load of 500 g and a temperature of 23° C. according to JIS K5401, a total light transmittance of about 92% or more and a haze of about 0.9% or less respectively measured by a color computer manufactured by Suga Instrument Corporation.

In one embodiment of the present invention, the molded article has an Izod notched impact strength of about 4.5 to about 9.0 kgf·cm/cm at a thickness of ¼" according to ASTM D256, a yellow index of about 1.0 to about 1.7 according to ASTM D1925, a pencil hardness of 1 H to 4 H at a load of 500 g and a temperature of 23° C. according to JIS K5401, a total light transmittance of about 92% to about 98% and a haze of about 0.5 to about 0.9% respectively measured by a color computer manufactured by Suga Instrument Corporation.

The methacrylate-based resin composition of the present invention may further comprise general additives such as flame retardants, lubricants, releasing agents, nucleating agents, antistatic agents, stabilizers, reinforcing agents, and the like, and combinations thereof, depending on the respective uses thereof, in addition to the foregoing components. The additives may be used alone or in combination thereof.

The methacrylate-based resin composition of the present invention can have excellent impact resistance, scratch resistance, transparency and external appearance. Therefore, the methacrylate-based resin composition of the present invention can replace conventional methyl methacrylate resins and can be used for housings for various electrical and electronic appliances. For instance, the methacrylate-based resin composition of the present invention can be used for housings of various electrical and electronic appliances, such as television sets, computers, printers, washing machines, cassette players and audio players, as well as rear lamp assemblies, instrument panel covers, eyeglass lenses, signboards and various sheet products.

The invention may be better understood by reference to the following examples which are intended for the purpose of illustration and are not to be construed as in any way limiting the scope of the present invention, which is defined in the claims appended hereto.

EXAMPLES

Example 1

To a high pressure reactor are added 36.3 parts by weight of a butyl acrylate monomer, 132 parts by weight of process water, 0.6 part by weight of a cross-linking agent (TAIC), 0.3 part by weight of a molecular weight controlling agent (n-octyl mercaptane), 2.0 parts by weight of an electrolyte (potassium carbamate), 2.0 parts by weight of an emulsifier (potassium stearate) and 0.6 part by weight of an antioxidant (octadecyl 3-(3,5-di-tert-butyl-4-hydroxyphenyl)propionate), and the reactor is sealed and clamped. After assessing a leak part of the reactor by pressurizing nitrogen into the reactor in order to conduct an air-tightness assessment of the reactor, 23.7 parts by weight of a butadiene monomer is introduced into the reactor. After increasing the temperature of the reactor to 70° C., 0.8 part by weight of an initiator (potassium persulfate) is added into the reactor to initiate the reaction. The temperature of the reactor is maintained at 70° C. by using a heat medium and cooling water in a reactor jacket. The polymerization ratio and the particle diameter are measured at a time point when 4 hours passed after the initiator is added into the reactor, and the measured polymerization ratio and particle diameter are 94% and 200 nm, respectively. While increasing the temperature of the reactor to 85° C. for one hour, 40 parts by weight of a methyl methacrylate monomer is mixed with 0.5 part by weight of a molecular weight controlling agent (n-octyl mercaptane), and then, the mixture is continuously introduced into the reactor for 30 minutes for a graft polymerization. The reactor is cooled to finish the polymerization after maintaining the temperature of the reactor to 85° C. for about 3 hours after the methyl methacrylate monomer is introduced into the reactor. A composition for the prepared impact modifier contains a rubber comprising 60.5% by weight of a butyl acrylate monomer and 39.5% by weight of a butadiene monomer, and comprises 60% by weight of a rubber polymer and 40% by weight of a methyl methacrylate monomer.

After analyzing the prepared sample in a latex state, the mixture is agglomerated by slowly adding 100 parts by weight of the analyzed sample into 140 parts by weight of a 1% sulfuric acid solution that is rotated at a rotational speed of 250 rpm and maintained at 67° C. Hard agglomerated particles are formed by increasing a temperature of the agglomerated mixture to 90° C., the hard agglomerated particles are dehydrated by a centrifuge, and the dehydrated agglomerated particles are dried to a water content of not more than 0.5% by a fluidized-bed dryer. To 20 parts by weight of the dried sample, 80 parts by weight of PMMA with a weight average molecular weight of 97,000 is added and extruded to prepare a test specimen at an extrusion temperature of 230° C. using an extrusion and injection molding machine. The physical properties of the test specimens are measured, and the results are shown in Table 1.

Example 2

Example 2 is prepared in the same manner as in Example 1 except that the polymerization ratio, the particle diameter and the methyl methacrylate injecting time are changed to 96%, 198 nm and 80 minutes, respectively, by extending the rubber polymer polymerizing time by 1 hour, i.e., by polymerizing the rubber polymer for 5 hours.

Example 3

Example 3 is prepared in the same manner as in Example 1 except that the contents of the rubber polymer and the methyl methacrylate monomer are changed to 55% by weight and 45% by weight, respectively, and the graft polymerization is performed at a rubber polymer particle diameter of 178 nm.

Comparative Example 1

Comparative Example 1 is prepared in the same manner as in Example 1 except that the contents of the butadiene monomer and the butyl acrylate monomer are changed to 30 parts by weight and 30 parts by weight, respectively.

Comparative Example 2

Comparative Example 2 is prepared in the same manner as in Example 1 except that the contents of the rubber polymer and the methyl methacrylate monomer are changed to 80% by weight and 20% by weight, respectively, and the graft polymerization is performed at a rubber polymer particle diameter of 251 nm.

Comparative Example 3

Comparative Example 3 is prepared in the same manner as in Example 1 except that the contents of the rubber polymer and the methyl methacrylate monomer are changed to 50% by weight and 50% by weight, respectively, and the graft polymerization is performed at a rubber polymer particle diameter of 142 nm.

Comparative Example 4

Comparative Example 4 is prepared in the same manner as in Example 1 except that the content of the emulsifier is changed to 0.8 part by weight during the preparation of the rubber polymer, and the graft polymerization is performed at a rubber polymer particle diameter of 332 nm.

Comparative Example 5

Comparative Example 5 is prepared in the same manner as in Example 1 except that the content of the cross-linking agent is changed to 2.0 parts by weight.

Comparative Example 6

Comparative Example 6 is prepared in the same manner as in Example 1 except that the antioxidant is not used.

Comparative Example 7

PMMA with a weight average molecular weight of 97,000 solely is extruded to prepare a test specimen at an extrusion temperature of 230° C. using an extrusion and injection molding machine. The physical properties of the test specimen are measured, and the results are shown in Table 1.

The physical properties of the samples prepared in the foregoing Examples and Comparative Examples are evaluated by the following methods, and evaluation results are represented in Table 1.

(1) Conversion ratio: Degree of polymerization of the monomer except for a composition of nonvolatile materials is measured after measuring the total solid content of the sample.

Total solid content=(weight of sample after drying/ weight of sample before drying)×100

Conversion ratio=[(total solid content=nonvolatile material content)×total]/total monomer weight (2) Particle diameter of rubber: Volume average particle diameter of the rubber is measured using a particle size measuring instrument A380 manufactured by Nicomp Corporation.

(3) Notched izod impact strength (kgf cm/cm): The notch Izod impact strength is measured at a thickness of ¼" according to ASTM D256.

(4) Flow index (g/10 min): The melt flow index is measured according to ASTM D1238.

(5) Yellow index: The yellow index is measured according to ASTM D1925.

(6) Pencil hardness: The pencil hardness is measured by applying 500 g load 5 times to a surface of a test sample having a size of 3 mm (thickness)×10 mm (length)×6 mm (width) according to JIS (Japanese Industry Standard) K5401 at 23° C. The surface of the sample is visually checked for scratches. If scratches are observed in two or more, the test is repeated with a pencil of one grade lower hardness. The results were classified into 4B~4H.

(7) Rubbing characteristics: After repeatedly rubbing the sample with a towel 1000 times, the degree of scratching on the surface is observed by the naked eye. (excellent>◎good>deteriorative>▲ bad)

(8) Transparency is measured by a color computer measuring instrument manufactured by Suga Instrument Corporation, and the measurement results represent total light transmittance and a haze.

Total light transmittance(%)=(light transmitted at all forward angles through a specimen)/(incident light through a specimen)×100

Haze(%)=(diffused transmission light)/(total light transmittance)×100

TABLE 1

|  |  | Examples | | | Comparative Examples | | | | | | |
|---|---|---|---|---|---|---|---|---|---|---|---|
|  |  | 1 | 2 | 3 | 1 | 2 | 3 | 4 | 5 | 6 | 7 |
| Rubber | Butadiene (%) | 39.5 | 39.5 | 39.5 | 50 | 39.5 | 39.5 | 39.5 | 39.5 | 39.5 | — |
|  | Alkyl acrylate (%) | 60.5 | 60.5 | 60.5 | 50 | 60.5 | 60.5 | 60.5 | 60.5 | 60.5 | — |
| Rubber/MMA |  | 60/40 | 60/40 | 55/45 | 60/40 | 80/20 | 50/50 | 60/40 | 60/40 | 60/40 | 0/100 |
| Rubber conversion ratio (%) |  | 94 | 96 | 95 | 95 | 92 | 98 | 92 | 93 | 96 | — |
| Rubber particle diameter (nm) |  | 200 | 198 | 178 | 182 | 251 | 142 | 332 | 179 | 201 | — |
| Izod impact strength (¼" notch) ASTM D256 |  | 6.0 | 5.9 | 4.9 | 6.2 | 6.1 | 2.1 | 7.6 | 2.3 | 6.0 | 2.1 |
| Flow index (ASTM D1238) |  | 4.1 | 4.1 | 4.1 | 3.2 | 2.9 | 3.9 | 1.4 | 3.2 | 4.0 | 4.0 |
| Yellow index (ASTM D1925) |  | 1.4 | 1.4 | 1.3 | 16.6 | 8.9 | 1.9 | 2.8 | 2.1 | 7.2 | 0.9 |
| Pencil hardness |  | 1H | 1H | 1H | B | F | 1H | F | F | 1H | 2H |
| Rubbing characteristics |  | ◯ | ◯ | ◯ | ▲ | ◯ | ▲ | ◯ |  |  | ▲ |
| Transparency | Total light transmittance (%) | 92.3 | 92.2 | 92.4 | 72.4 | 82.8 | 92.1 | 80.9 | 90.2 | 92.1 | 92.8 |
|  | Haze (%) | 0.9 | 0.9 | 0.8 | 69.0 | 30.8 | 1.0 | 36.0 | 2.1 | 1.1 | 0.6 |

As shown in Table 1, Examples 1, 2 and 3, which include the impact modifier of the invention, have improved impact resistance and excellent surface scratch resistance without significant deterioration in transparency and haze characteristics as compared with PMMA of Comparative Example 7, which did not include an impact modifier. Comparative Example 1, which includes a diene-based monomer and alkyl acrylate in an amount outside of the present invention, has deteriorated transparency and yellow index and its scratch resistance also dropped rapidly. Comparative Example 2, which includes a rubber to MMA ratio outside of the ratio of the present invention, has deteriorated transparency, yellow index and also flowability.

Comparative Example 3, which includes a rubber with an average particle diameter outside of the present invention, has deteriorated impact resistance. Comparative Example 4 has lowered yellow index and transparency and also deteriorated rubbing characteristics.

Comparative Example 5, which includes the cross-linking agent in an amount outside of the present invention, has lowered impact strength and also deteriorated scratch resistance and transparency. Further, Comparative Example 6, which did not include an anti-oxidant during the polymerization, is not suitable for the present invention since its yellow index is high.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. An impact modifier formed by graft polymerizing 55 to 70% by weight of a rubber polymer with 30 to 45% by weight of a methacrylate-based monomer, wherein said rubber polymer is prepared by polymerizing 100 parts by weight of a monomer mixture comprising 30 to 45% by weight of a diene-based monomer and 55 to 70% by weight of alkyl acrylate in the presence of 0.1 to 1 part by weight of an antioxidant using a cross-linking agent in an amount of 0.5 to 1 part by weight per 100 parts by weight of the monomer mixture, wherein said rubber polymer has a particle diameter of about 170 nm to about 230 nm, and wherein the impact modifier added to a methacrylate-based resin composition in an amount of 5 to 45% by weight provides a molded article having an Izod notched impact strength of about 4.5 to about 9 kgf·cm/cm at a thickness of ¼" according to ASTM D256, a yellow index of about 1.7 or less according to ASTM D1925, a pencil hardness of 1H or more at a load of 500 g and a temperature of 23° C. according to JIS K5401, a total light transmittance of about 92% or more and a haze of about 0.9% or less respectively measured by a color computer manufactured by Suga Instrument Corporation.

2. The impact modifier of claim 1, wherein said methacrylate-based monomer comprises a C1 to C10 alkyl methacrylate.

3. The impact modifier of claim 1, wherein said alkyl acrylate comprises a C1 to C10 alkyl acrylate.

4. The impact modifier of claim 1, wherein said antioxidant is octadecyl 3-(3,5-di-tert-butyl-4-hydroxyphenyl)propionate, triethylene glycol-bis-3(3-tert-butyl-4-hydroxy-5-methylphenyl)propionate, 2,6-di-tert-butyl-4-methylphenol, 2,2'-methylene-bis-(4-methyl-6-tert-butylphenol), tri(2,4-di-tert-butylphenyl)phosphate, n-octadecyl-3(3,5-di-tert-butyl-4-hydroxyphenyl)propionate, 1,3,5-tri(3,5-di-tert-butyl-4-hydroxyphenyl)isocyanate, distearyl-thio-dipropionate, laurylthio propionate methane, di-phenyl-isooctyl phosphite, or a combination thereof.

5. A methacrylate-based resin composition comprising the impact modifier as defined in claim 1.

6. A molded article produced from the resin composition of claim 5.

7. A method for preparing an impact modifier comprising: polymerizing a monomer mixture comprising 30 to 45% by weight of a diene-based monomer and 55 to 70% by weight of alkyl acrylate in the presence of 0.1 to 1 part by weight of an antioxidant and using 0.5 to 1 part by weight of a cross-linking agent per 100 parts by weight of the monomer mixture to prepare a rubber polymer with a particle diameter of 170 nm to about 230 nm; and adding 30 to 45% by weight of a methacrylate-based monomer into 55 to 70% by weight of the rubber polymer to graft polymerize the methacrylate-based monomer with the rubber polymer to form an impact modifier, wherein the impact modifier added to a methacrylate-based resin composition in an amount of 5 to 45% by weight provides a molded article having an Izod notched impact strength of about 4.5 to about 9 kqf·cm/cm at a thickness of ¼" according to ASTM D256, a yellow index of about 1.7 or less according to ASTM D1925, a pencil hardness of 1 H or more at a load of 500 g and a temperature of 23° C. according to JIS K5401, a total light transmittance of about 92% or more and a haze of about 0.9% or less respectively measured by a color computer manufactured by Suga Instrument Corporation.

8. The method of claim 7, wherein said alkyl acrylate comprises an C1 to C10 alkyl acrylate.

9. The method of claim 7, wherein said methacrylate-based monomer comprises a C1 to C10 alkyl methacrylate.

10. The method of claim 7, wherein said monomer mixture is polymerized using a molecular weight controlling agent.

11. The method of claim 7, wherein said cross-linking agent is triallyl isocyanurate, allyl methacrylate, or a combination thereof.

12. The method of claim 7, wherein said antioxidant is octadecyl 3-(3,5-di-tert-butyl-4-hydroxyphenyl)propionate, triethylene glycol-bis-3(3-tert-butyl-4-hydroxy-5-methylphenyl)propionate, 2,6-di-tert-butyl-4-methylphenol, 2,2'-methylene-bis-(4-methyl-6-tert-butylphenol), tri(2,4-di-tert-butylphenyl)phosphate, n-octadecyl-3(3,5-di-tert-butyl-4-hydroxyphenyl)propionate, 1,3,5-tri(3,5-di-tert-butyl-4-hydroxyphenyl)isocyanate, distearyl-thio-dipropionate, laurylthio propionate methane, di-phenyl-isooctyl phosphite, or a combination thereof.

13. The method of claim 7, wherein said methacrylate-based monomer is introduced when a conversion ratio of the rubber polymer is about 70 to about 98%.

* * * * *

UNITED STATES PATENT AND TRADEMARK OFFICE
CERTIFICATE OF CORRECTION

PATENT NO. : 9,096,704 B2  
APPLICATION NO. : 12/476396  
DATED : August 4, 2015  
INVENTOR(S) : Ki Bo Chang et al.

Page 1 of 2

It is certified that error appears in the above-identified patent and that said Letters Patent is hereby corrected as shown below:

In the Specification

Column 11, Line 16 reads: "(excellent> O good>deteriorative> ▲bad)"
and should read: "( ◎ excellent> O good> deteriorative> ▲bad)"

Column 11, Table 1 is depicted as:

|  |  | Examples | | | Comparative Examples | | | | | | |
|---|---|---|---|---|---|---|---|---|---|---|---|
|  |  | 1 | 2 | 3 | 1 | 2 | 3 | 4 | 5 | 6 | 7 |
| Rubber | Butadiene (%) | 39.5 | 39.5 | 39.5 | 50 | 39.5 | 39.5 | 39.5 | 39.5 | 39.5 | - |
|  | Alkyl acrylate (%) | 60.5 | 60.5 | 60.5 | 50 | 60.5 | 60.5 | 60.5 | 60.5 | 60.5 | - |
| Rubber/MMA | | 60/40 | 60/40 | 55/45 | 60/40 | 80/20 | 50/50 | 60/40 | 60/40 | 60/40 | 0/100 |
| Rubber conversion ratio (%) | | 94 | 96 | 95 | 95 | 92 | 98 | 92 | 93 | 96 | - |
| Rubber particle diameter (nm) | | 200 | 198 | 178 | 182 | 251 | 142 | 332 | 179 | 201 | - |
| Izod impact strength (1/4" notch) ASTM D256 | | 6.0 | 5.9 | 4.9 | 6.2 | 6.1 | 2.1 | 7.6 | 2.3 | 6.0 | 2.1 |
| Flow index (ASTM D1238) | | 4.1 | 4.1 | 4.1 | 3.2 | 2.9 | 3.9 | 1.4 | 3.2 | 4.0 | 4.0 |
| Yellow index (ASTM D1925) | | 1.4 | 1.4 | 1.3 | 16.6 | 8.9 | 1.9 | 2.8 | 2.1 | 7.2 | 0.9 |
| Pencil hardness | | 1H | 1H | 1H | B | F | 1H | F | F | 1H | 2H |
| ~~Rubbing characteristics~~ | | | | | O | O | | ▲ | O | | ▲ |
| Transparency | Total light transmittance (%) | 92.3 | 92.2 | 92.4 | 72.4 | 82.8 | 92.1 | 80.9 | 90.2 | 92.1 | 92.8 |
|  | Haze (%) | 0.9 | 0.9 | 0.8 | 69.0 | 30.8 | 1.0 | 36.0 | 2.1 | 1.1 | 0.6 |

Signed and Sealed this  
Tenth Day of May, 2016

Michelle K. Lee  
*Director of the United States Patent and Trademark Office* and should be depicted as:

|  |  | Examples | | | Comparative Examples | | | | | | |
| --- | --- | --- | --- | --- | --- | --- | --- | --- | --- | --- | --- |
|  |  | 1 | 2 | 3 | 1 | 2 | 3 | 4 | 5 | 6 | 7 |
| Rubber | Butadiene (%) | 39.5 | 39.5 | 39.5 | 50 | 39.5 | 39.5 | 39.5 | 39.5 | 39.5 | - |
|  | Alkyl acrylate (%) | 60.5 | 60.5 | 60.5 | 50 | 60.5 | 60.5 | 60.5 | 60.5 | 60.5 | - |
| Rubber/MMA | | 60/40 | 60/40 | 55/45 | 60/40 | 80/20 | 50/50 | 60/40 | 60/40 | 60/40 | 0/100 |
| Rubber conversion ratio (%) | | 94 | 96 | 95 | 95 | 92 | 98 | 92 | 93 | 96 | - |
| Rubber particle diameter (nm) | | 200 | 198 | 178 | 182 | 251 | 142 | 332 | 179 | 201 | - |
| Izod impact strength (1/4" notch) ASTM D256 | | 6.0 | 5.9 | 4.9 | 6.2 | 6.1 | 2.1 | 7.6 | 2.3 | 6.0 | 2.1 |
| Flow index (ASTM D1238) | | 4.1 | 4.1 | 4.1 | 3.2 | 2.9 | 3.9 | 1.4 | 3.2 | 4.0 | 4.0 |
| Yellow index (ASTM D1925) | | 1.4 | 1.4 | 1.3 | 16.6 | 8.9 | 1.9 | 2.8 | 2.1 | 7.2 | 0.9 |
| Pencil hardness | | 1H | 1H | 1H | B | F | 1H | F | F | 1H | 2H |
| Rubbing characteristics | | ◎ | ◎ | O | O | △ | ▲ | O | △ | ◎ | ▲ |
| Transparency | Total light transmittance (%) | 92.3 | 92.2 | 92.4 | 72.4 | 82.8 | 92.1 | 80.9 | 90.2 | 92.1 | 92.8 |
|  | Haze (%) | 0.9 | 0.9 | 0.8 | 69.0 | 30.8 | 1.0 | 36.0 | 2.1 | 1.1 | 0.6 |

In the Claims
Column 13, Claim 7, Line 19 reads: "to prepare a rubber polymer with a particle diameter of 170"
and should read: "to prepare a rubber polymer with a particle diameter of about 170"

Column 14, Claim 8, Line 8 reads: "comprises an C1 to C10 alkyl acrylate"
and should read: "comprises a C1 to C10 alkyl acrylate"